United States Patent Office.

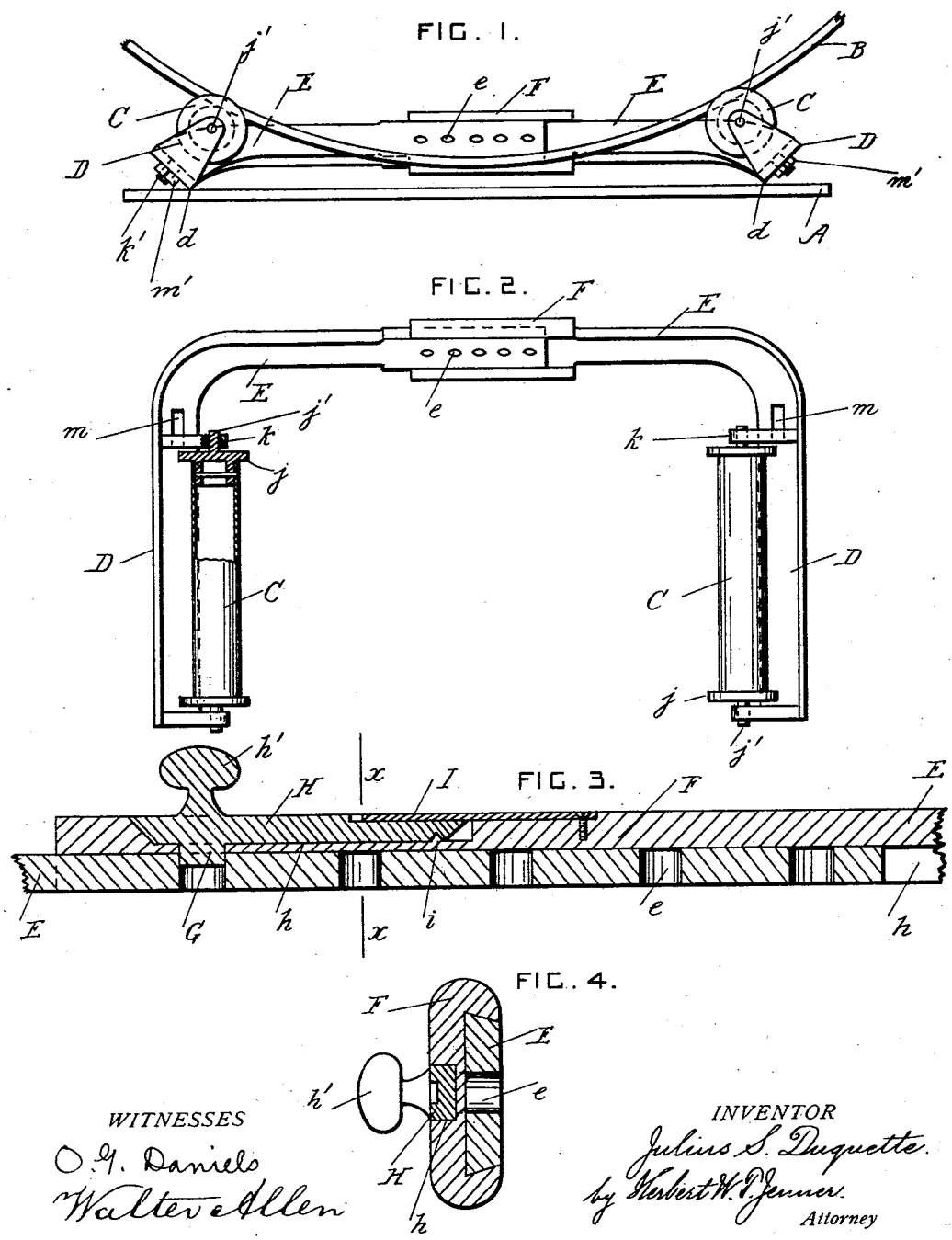

JULIUS S. DUQUETTE, OF SOUTH GARDNER, MASSACHUSETTS.

SUPPORT FOR WHEEL-TIRES.

SPECIFICATION forming part of Letters Patent No. 684,417, dated October 15, 1901.

Application filed May 28, 1901. Serial No. 62,218. (No model.)

*To all whom it may concern:*

Be it known that I, JULIUS S. DUQUETTE, a citizen of the United States, residing at South Gardner, in the county of Worcester and State of Massachusetts, have invented certain new and useful Improvements in Supports for Wheel-Tires; and I do hereby declare the following to be a full, clear, and exact description of the invention, such as will enable others skilled in the art to which it appertains to make and use the same.

This invention relates to a support for holding a tire while being heated in the fire on a blacksmith's hearth; and it consists in the novel construction and combination of the parts hereinafter fully described and claimed.

In the drawings, Figure 1 is a side view of the support. Fig. 2 is a plan view. Fig. 3 is a longitudinal section through the joint drawn to a larger scale. Fig. 4 is a cross-section taken on the line $x$ $x$ in Fig. 3.

A is the top plate of a blacksmith's hearth, and B is a portion of a tire which is heated in the fire on the hearth. In order that the tire may be rolled upon its axis over the fire, it is supported on two flanged rollers C. These rollers are journaled in brackets D, arranged at an angle, so that one side edge $d$ only of each bracket rests upon the plate A. As the edge $d$ is sharp it does not slip on the plate A, and no cinders can lodge between the edge $d$ and the plate A. Each bracket has a curved arm E at one end, and one of the said arms has a dovetailed socket F, in which the other said arm is slidable. The slidable arm is provided with a series of holes $e$, and the other arm has a catch G for engaging with the said holes and locking the two arms together. A recess $h$ is formed in the back of the socket F, and the catch G is carried by a bar H, provided with a knob $h'$. The bar H is fitted into the recess $h$, so that it is flush with the back of the socket, and the catch G projects through a hole in the socket and engages with either of the holes $e$. A small projection $i$ is formed at one end of the recess on the socket, and the bar H has a notch which engages with the projection.

I is a spring which is secured in a recess on the back of the socket and which engages with a recess in the back of the bar H, so that the spring is flush with the bar and the back of the socket. In this manner the catch can readily be operated, and there are no pivot-pins or holes to become stopped up by coal-dust.

After the brackets have been set at the requisite distance apart the tire is rested on the flanged rollers and can be rolled upon them with its lower part in or over the fire on the hearth, so that any portion of the tire can be heated.

The rollers C are preferably formed of tubular middle portions and have caps $j$, provided with projecting pivots $j'$. The caps are riveted to the tubular middle parts of the rollers, and the brackets D have movable lugs $k$, which permit the rollers to be mounted in position. The lugs $k$ have stems $k'$, which are slidable in slots $m$ in the lower parts of the brackets, and $m'$ indicates nuts on the said stems for securing the movable lugs after the rollers have been placed in position.

What I claim is—

1. In a support for a tire, the combination, with two brackets arranged at an angle with one side edge projecting downwardly, each said bracket being provided with a bent arm at one end; of means for securing the said arms together after the position of the brackets has been adjusted, and rollers journaled in the said brackets, substantially as set forth.

2. In a support for a tire, the combination, with two brackets provided with bent arms at one end, one of the said arms being provided with a dovetailed socket in which the other said arm is slidable, and the said socket having a recess in its back, of a bar arranged in the said recess flush with the back of the socket and provided with a catch for engaging with holes in the other arm, a spring for holding the said catch in position, and a projection in the bottom of the said recess which engages with a notch in one end portion of the said bar, substantially as set forth.

3. In a support for a tire, the combination, with two brackets arranged at an angle with one side edge projecting downwardly, each said bracket being provided with a curved arm at one end, a longitudinal slot, and a lug adjustable in the said slot; of means for securing the said arms together; and rollers having tubular middle portions and caps secured to the said middle portions and provided with projecting pivots which are mounted in the said brackets, substantially as set forth.

In testimony whereof I affix my signature in presence of two witnesses.

JULIUS S. DUQUETTE.

Witnesses:
 JENNIE E. WILSON,
 WALTER S. CHAPIN.